(12) United States Patent
Kakkori

(10) Patent No.: US 7,493,030 B2
(45) Date of Patent: *Feb. 17, 2009

(54) ADAPTIVE OPTICAL PLANE FORMATION WITH ROLLING SHUTTER

(75) Inventor: Hannu Kakkori, Tampere (FI)

(73) Assignee: Nokia Corporation, Espoo (FI)

( * ) Notice: Subject to any disclaimer, the term of this patent is extended or adjusted under 35 U.S.C. 154(b) by 484 days.

This patent is subject to a terminal disclaimer.

(21) Appl. No.: 11/165,992

(22) Filed: Jun. 24, 2005

(65) Prior Publication Data

US 2006/0291844 A1 Dec. 28, 2006

(51) Int. Cl.
  G03B 3/00 (2006.01)
  G03B 7/00 (2006.01)
  G02B 1/06 (2006.01)
  G02B 3/12 (2006.01)
  G02B 13/02 (2006.01)
  G02B 13/18 (2006.01)
  G02B 3/10 (2006.01)
  H04N 5/225 (2006.01)

(52) U.S. Cl. .......................... 396/65; 396/89; 396/325; 359/666; 359/708; 359/721; 348/207.99

(58) Field of Classification Search .................. 396/89, 396/335, 348, 351, 65; 358/302; 359/205, 359/212, 666, 708, 721; 348/345, 349, 296, 348/362, 367
See application file for complete search history.

(56) References Cited

U.S. PATENT DOCUMENTS

| | | | | |
|---|---|---|---|---|
| 3,537,373 A | * | 11/1970 | Land | 396/21 |
| 4,484,233 A | * | 11/1984 | Strout et al. | 358/302 |
| 5,282,045 A | | 1/1994 | Mimura et al. | 358/227 |
| 5,745,175 A | | 4/1998 | Anderson | 348/345 |
| 6,369,954 B1 | | 4/2002 | Berge et al. | 359/666 |
| 6,445,415 B1 | | 9/2002 | Olsson | 348/345 |
| 6,567,126 B1 | | 5/2003 | Slatter et al. | 348/345 |
| 6,783,068 B2 | | 8/2004 | Hecht | 235/435 |
| 2004/0217257 A1 | | 11/2004 | Fiete et al. | 250/201.7 |
| 2004/0223075 A1 | * | 11/2004 | Furlan et al. | 348/363 |
| 2006/0202038 A1 | * | 9/2006 | Wang et al. | 235/462.24 |

FOREIGN PATENT DOCUMENTS

JP  2003-131115 A  5/2003

* cited by examiner

Primary Examiner—Melissa J Koval
(74) Attorney, Agent, or Firm—Harrington & Smith, PC

(57) ABSTRACT

A scene is imaged by moving an optical lens relative to an image sensing surface (such as film or a pixel array) synchronously with exposing different portions of the image sensing surface. The synchronous actions are preferably adaptable to the scene being imaged, so objects at different object distances are focused at different times and exposed to different portions of the sensing surface at different times within an exposure frame period. Exposure time for the different portions of the sensor may be varied according to speed or brightness of the different objects in the scene to be imaged, as detected at the camera by measuring apparatus similar to auto focus distance measuring apparatus. A camera and a program of computer readable instructions are also detailed. Alternatives to moving the lens relative to the image sensing surface include changing a shape of the lens.

25 Claims, 8 Drawing Sheets

ADAPTIVE OPTICAL PLANE FORMATION WITH ROLLING SHUTTER

TECHNICAL FIELD

The present invention relates to methods and optical devices that provide an increased depth of field.

BACKGROUND

Traditional photography relies on exposing a planar portion of the film through a fixed focusing lens (or lenses) so that an object of interest would be precisely focused on the film. The film is disposed perpendicular to an optical axis and located at an image distance $s_i$ behind the lens that matches an object distance $s_0$ at which the object is located in front of the lens. Especially in macro photography but to a lesser extent with all photography, other objects within the exposed scene but at a distance other than the image distance $s_0$ are out of focus on the film. This basic concept prevalent throughout film photography continued as digital photography was introduced, using a pixilated array in place of the film.

FIG. 1 is a prior art schematic diagram showing a lens 20 focused on an object located at an infinite object distance, so that all light rays 22 incoming to the lens 20 are substantially parallel. The lens is assumed thin for certain assumptions. The focal length f of the lens 20 is that distance behind the lens where parallel light rays entering the lens are focused. The image distance $s_i$ is that distance behind the lens 20 wherein light through the lens from a specific object distance $s_0$ is focused. Since the object distance $s_0$ in FIG. 1 is far (the light rays incoming to the lens 20 are substantially parallel), then $s_i$=f, the image distance is the lens focal length. The sensor 24, which may be film, a digital pixilated surface, a sensing array, etc., is positioned at the image distance $s_i$ so that the particular object imaged is in focus. This relation is described by the Gaussian (thin) lens formula:

$$\frac{1}{f} = \frac{1}{s_0} + \frac{1}{s_i}.$$

For an object located at an infinite distance, $s_0$ is large and $1/s_0$ becomes vanishingly small, so $f \approx s_i$. FIG. 2A is similar to FIG. 1, but with the lens 20 moved so that an object at a distance $s_0 << \infty$ (e.g., less than about 20') is instead focused on the sensor 24. The focal length f has not changed between FIGS. 1 and 2A; it is set by the shape and refractive index of the lens 20. Movement of the lens 20 or sensor 24 enables focusing of non-parallel incoming light rays 22 at the sensor 24, and the relation is represented mathematically as $$s_i = \frac{s_0 f}{s_0 - f}.$$

FIG. 2B is a photograph (such as one taken with the lens arrangement of FIG. 2A) of domino tiles disposed at various distances from the lens, and illustrates depth of field. The image shows three consecutive domino tiles 25, 26, 27, each having a horizontal line and three dots visible above that line. The middle of those three domino tiles 26 is located at the distance $s_0$ of FIG. 2A, and is therefore in sharp focus on the sensor that we view as FIG. 2B. The remaining two 25, 27 of those three domino tiles are in acceptable focus, and are located at respective distances $s_0$-x and $s_0$-x, assuming all domino tiles are equally spaced from one another by a distance x. All other domino tiles are blurred, as they are located more than the distance x from $s_0$. Critical or precise focus may be achieved at only one distance $s_0$ from the lens 20. In FIGS. 1-2B, this distance is the object distance $s_0$.

As is evident in FIG. 2B, there is a range of distances ($s_0$±x) for which focus is acceptably sharp. This zone of acceptable focus is termed depth of field. More technically, the depth of field is the region where the size of the circle of confusion is less than the resolution of the human eye. The circle of confusion is a term well known in the optical and photographic arts, and relates to the fuzziest a point can be and still be considered "in focus". Increasing depth of field has been the subject of certain improvements to the arrangements of FIGS. 1 and 2A.

One such prior art arrangement to increase depth of field is shown schematically at FIG. 3. In this arrangement, the sensor 24 defines a surface that is tilted and no longer perpendicular to the optical axis 26 defined by the lens 20. An object located nearer the top of FIG. 3 is at a distance $s_{01}$ from the lens 20. Light rays 22a incoming to the lens 20 are not parallel, is focused precisely at a portion of the sensor 24 at a distance $s_{i1}$ behind the lens 20. Within the same scene and within the same exposure of the sensor is a second object, located nearer the bottom of FIG. 3 and at a distance $s_{0inf}$ from the lens 20. Light rays 22b from this second object are substantially parallel when they enter the lens 20, and are focused precisely on a portion of the sensor 24 that is at a distance $s_{iinf}$ behind the lens 20. Because $s_{i1}$ is not equal to $s_{iinf}$, depth of field is increased, i.e. the position of the best focus shifts when moving from the top of FIG. 3 towards the bottom of FIG. 3. The arrangement of FIG. 3 is implemented commercially in the Canon® TS-E 24 mm lens of FIG. 4 allowing to better image objects or scenes which appear "tilted" respect to the camera device. This effect is achieved by arranging a tilt angle between the imaging lens(es) and the sensor plane either by tilting the lens(es) alone or by tilting the sensor itself, as described below.

Another prior art arrangement is described in U.S. Pat. No. 6,783,068, entitled "Large Depth of Field Line Scan Camera". In this adaptation, a scanning system utilizes a randomly addressable image sensor, which is selectively positioned at the Scheimpflug angle in the image plane in order to detect focused light reflected from an object. Light reflected from the object is focused onto the sensor through an objective lens. Since the sensor is mounted at the Scheimpflug angle, each strip within the depth of field of the object plane has corresponding pixels on the sensor that are in focus.

U.S. Pat. No. 6,567,126 is entitled "Planar Focus Correction" and describes a camera that includes a detector array and an objective lens arranged to direct optical radiation from an object plane onto the detector. The lens defines an optical axis of the camera, and the object plane is at an oblique angle. An optical axis movement device changes the relative orientation of the detector with respect to the lens so that the detector and lens may be moved relatively toward or away from each other along the optical axis and also tilted with respect to each other with at least one degree of freedom. This enables a focus detection device, connected to the detector, to detect when a portion of an image falling on the detector is in focus, holding an in-focus portion of the image in focus until a second portion also comes into focus.

U.S. Pat. No. 6,445,415 is entitled "Increased Depth of Field for Photography" and is described as primarily for electronic cameras. An image is created electronically from a sensor in the camera and is based on a multi photo technique.

Several photos are shot with different focused parts of the scene subjects in the respective photo, and a basic image is integrated by contributions from the different images. Calculated image transfers are based on lens- or sensor settings for the respective images.

U.S. Pat. No. 5,282,045 is entitled "Depth of Field Control Apparatus and Image Pickup Apparatus Having the Same Therein". In this patent, image signals corresponding to a plurality of picture images different in focal point or length position are obtained by a mechanism for changing a focal point or length position to produce a new image signal by composing these image signals through a composition circuit. Motion information of an object is obtained by a circuit for detecting a moving portion in the object to control the image composition by the motion information. The focal point or length position is moved in synchronism with an integer multiple of a vertical scanning period of the television. The image signals corresponding to the plurality of picture images, different in focal point or length position, are obtained within one vertical scanning period determined by the system of the television. The amount of movement of the focal point or length position is controlled in conjunction with a value of a lens aperture of the camera lens. The image composition is controlled by a composition control circuit made up of a circuit for detecting individual powers of image signals corresponding to a plurality of different picture images, a circuit for comparing the detected powers with each other, and a circuit for detecting the position of an edge included in one of the image signals. A control signal for the image composition produced by the power comparison circuit is compensated by the edge position information obtained by the edge detection circuit.

While interesting, each of the above prior art descriptions appear to overlay different planar images of objects within a scene to arrive at a composite having a higher depth of field as compared to any of the individual planar images. However, optical lenses are known to define a Petzval surface or Petzval field curvature as shown in FIG. 5. Briefly, a Petzval surface is a paraboloidal surface at which objects lying along a plane that is perpendicular to the optical axis are precisely focused on the opposed side of the lens 20. Assume a fixed distance of $s_0$ in FIG. 5. Objects at the distance $s_0$ from the optical center 32 in front of the lens 20 are along the curved surface $\delta_0$, and absent aberrations are focused precisely at the curved surface 28 behind the lens 20 as defined by the image distance $s_i$. These curves $\delta_0$ and 28 are typically spherical, but their shape depends upon the lens curvature. Now, flatten the curve $\delta_0$ to a plane that is perpendicular to the optical axis 26 at a distance $s_0$, yielding the object plane $\delta_0'$. For imaging the scene at the object plane $\delta_0'$ at the planar sensor 24, this imposes an additional aberration, because objects along the object plane $\delta_0'$ are now precisely focused along the Petzval surface 30, which further diverges from the (spherical) surface 28. It is stipulated that divergence between the planar and curved surfaces of FIG. 5 are exaggerated for clarity of illustration. The planar sensor 24 now images two orders of aberrations, the first due to its non-coincidence with the (spherical) surface 28 defined by the distance $s_i$, and the second due to its non-coincidence with the (paraboloidal) Petzval surface 30. The image is focused precisely only at the optical axis, where the sensor 24 is tangent to and co-incident with both curved surfaces 28, 30. Objects imaged off the optical axis are increasingly out of focus. These aberrations are due to field curvature. Using the example of FIG. 2B, the best-focused domino tile 26 may be precisely focused only at the horizontal line of that tile because that line is located along the optical axis, while the top and bottom of that same tile 26 are out of focus due to field curvature, though not particularly noticeable in FIG. 2B. None of the above prior art solutions for increasing depth-of-field are seen to offset field curvature, in either the first or second order. Whereas a four-lens arrangement known in the art may minimize or even eliminate the field curvature illustrated by FIG. 5, such arrangements yield a shallow depth of field, because the object distance at which precise focus is obtained is merely shifted from a curved to a planar surface without additional optical aberration, yet precise focus still lies at only one distance from the lens 20.

SUMMARY

The foregoing and other problems are overcome, and other advantages are realized, in accordance with the presently detailed embodiments of these teachings.

According to one embodiment, the invention is a method for imaging a scene. The method includes manipulating an optical relationship between an optical lens and an image sensing surface, and exposing different portions of the image sensing surface synchronous with manipulating the optical relationship. The optical relationship is manipulated so that the image sensing surface is spaced at different effective image distances from the lens. The synchronous actions may be adaptive to objects in the scene being imaged, such as distance of objects from the lens, brightness of objects to vary exposure time of the different portions, and/or speed of object movement to vary exposure time of the different portions. Exposing different portions of the sensing surface includes a traditional film and shutter arrangement, voltage integration of pixels on a digital sensing surface, as well as other imaging techniques.

According to another embodiment, the invention is another method for imaging a scene. This other method includes determining a first and a second object distance between a lens and respective first and second objects in a scene. Within a continuous exposure frame, a first portion of an image sensing surface is exposed while the image sensing surface is at a first effective image distance from the lens, and a second portion of the image sensing surface is exposed while the image sensing surface is at a second effective image distance from the lens. The first and second effective image distances correspond to the first and second object distances, generally in a known way according to optical characteristics of the lens itself. The exposed first and second portions are then combined into a single image.

According to another embodiment, the invention is a camera that includes a lens, an image sensor such as photographic film or an array of photo-sensitive pixels that form a sensing surface. The camera also includes exposure means for separately exposing different portions of the sensing surface within a single exposure frame. The exposure means may be a curtain-based rolling shutter or it may be integrating/exposing pixels (or groups or rows of pixels) over different time periods within the exposure frame. The camera also includes means for manipulating an optical relationship between the lens and the sensing surface so that the sensing surface lies at an image distance that changes. The means for manipulating may comprise mechanical linkage to move the lens and sensing surface relative to one another, or a voltage source with leads to apply a voltage to a liquid lens, thereby changing its shape and effective image distance. The camera includes a processor for synchronizing the means for manipulating with the exposure means.

According to another embodiment, the present invention is a device that includes a device housing, as well as a lens, an image sensor, exposure means and a processor as immediately above. The light passing through the lens also enters the housing, and the device may be a mobile station. This device has an optical manipulation means for maintaining the image sensor at an effective image distance from the lens that varies over the single exposure frame.

According to another embodiment, the invention is a program of machine-readable instructions, tangibly embodied on an information bearing medium and executable by a digital data processor, to perform actions directed toward operating a camera. The actions include, during an exposure frame period, maintaining an image sensing surface at a variable effective image distance from a lens synchronously with exposing different portions of the sensing surface. In some embodiments, either or both of maintaining the image sensing surface at the variable effective image distance and exposing different portions of the image sensing surface are adaptive to objects in a scene to be imaged at the sensing surface, such as their distance from the lens, their brightness, their speed of movement, or other parameters.

According to another embodiment, the invention is an apparatus for adaptively imaging a scene. The apparatus includes means for focusing light from a scene, means for imaging the focused light such as film or a pixilated array, means for determining a first and a second object distance, means for differentially exposing selectable portions of the sensing surface to light passing through the means for focusing, means for varying an effective image distance between the means for focusing light and the means for imaging, and means for synchronizing the means for varying with the means for differentially exposing.

According to yet another embodiment, the present invention is a method of imaging a scene. This method includes imposing on a sensing surface an effective optical curvature that depends from a scene, and imaging the scene at the sensing surface having the effective optical curvature. That the curvature is effective means that it need not be embodied in a spatial sense.

Other various aspects, embodiments, and adaptations of the invention are disclosed in detail below.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

Figure 1:
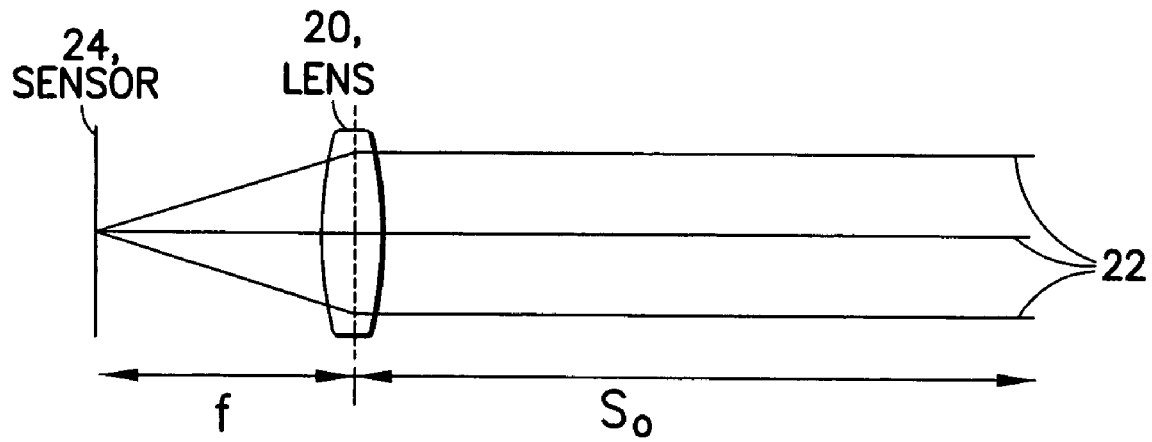
FIG. 1 is a prior art schematic diagram showing focusing of an object at a large object distance where incoming light rays may be considered as being parallel to one another.
Figure 2A:
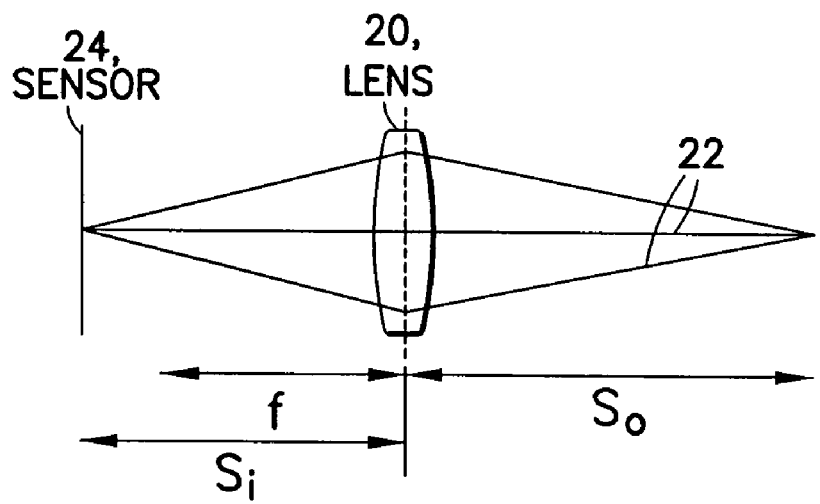
FIG. 2A is a prior art schematic diagram showing focusing of an object at a shorter distance where incoming light rays are not parallel.
Figure 2B:
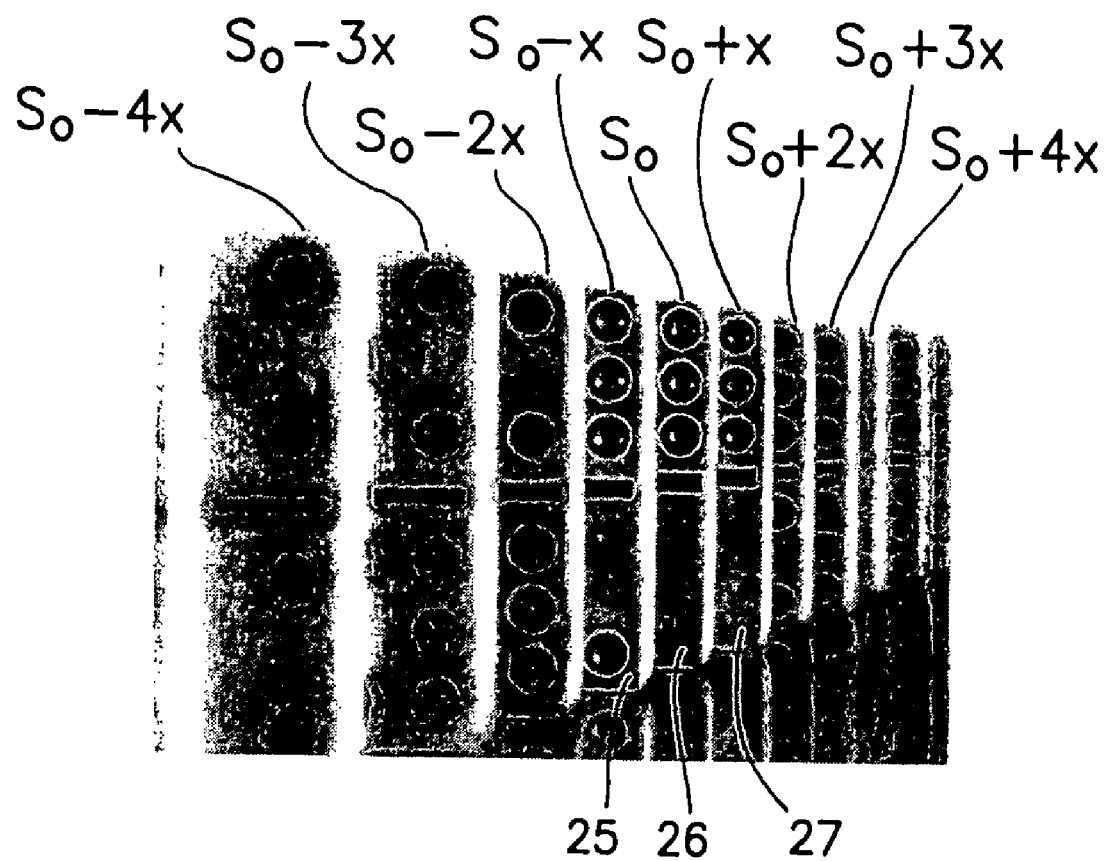
FIG. 2B is an image of domino tiles at different object distances, illustrating depth of field.
Figure 3:
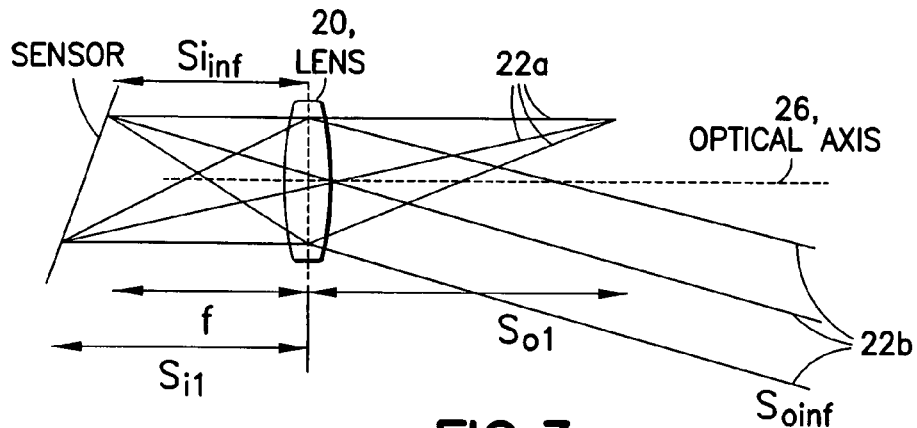
FIG. 3 is a prior art schematic diagram showing a sensor surface inclined relative to the optical axis defined by the lens.
Figure 4:
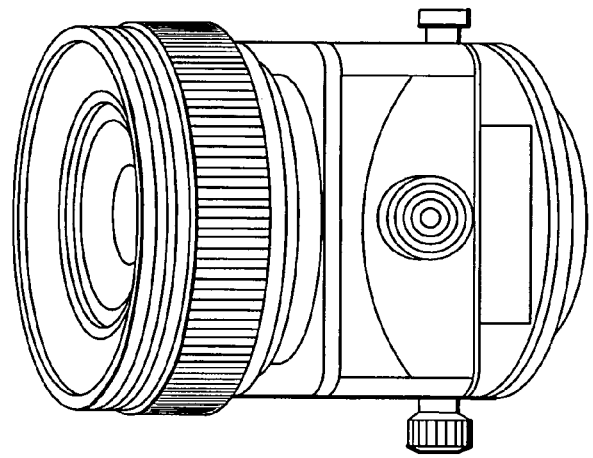
FIG. 4 is a prior art image of a commercial product incorporating the concept of FIG. 3.

The present invention incorporates in certain embodiments a rolling shutter. A focal plane shutter of a traditional 35 mm SLR camera creates a slit of variable width by using two curtains that travel in front of the photographic film. While the rate of the travel is fixed, exposure time is varied by changing the time that elapses between the release of the first shutter curtain and the release of the second shutter curtain. When the camera takes a photograph, the shutter is opened as follows: the first curtain is released, and at some later time (the exposure time), the second curtain is released. The width of the slit determines the total time any part of the film is exposed.

Digital photography uses an array of pixels (e.g., photodiodes) along the sensor surface, which are pre-charged to a known voltage prior to "exposure" of the sensor, which is technically the integration period of the individual pixels. The pixels are removed from the source of the pre-charge at the start of the integration period, when the actuator for the digital camera is depressed. Once the source of the pre-charge is disconnected from the pixels, each pixel leaks charge as a function of light (photons) striking that particular pixel. The remaining charge at the end of the integration period (typically at readout of the pixels) is inversely proportional to the light to which the pixel was exposed. The remaining charge on each pixel is electronically read out and spatially combined with other pixels of the array to construct the digital image.

The concept of rolling shutters in digital photography is then removing the pre-charge from a particular group of pixels, but not from all pixels in the array. Similarly to the rolling shutter of film photography, the pre-charge may be disconnected from different horizontal lines of pixels ion a sequential manner. Each line of pixels then has an integration period that is less than the scan period for the entire array; exposure of the pixels 'rolls' among the lines. Disconnecting the pre-charge from a line is analogous to releasing the first curtain of a 35 mm SLR camera, and readout (which ends the integration period) is analogous to releasing the second curtain. The term rolling shutter is used herein to refer to both film and digital embodiments. Clearly then, exposing different portions of an image sensing surface (to light through a lens), as used herein and in the claims, can be arranged by using a separate shutter external to the image sensor (e.g., traditional film photography), or without any external shutter using a sensor having internal (e.g, a readout integrated circuit) electronic rolling shutter capability, i.e., a sensor where the exposure of the pixels is defined electronically by how they are read out, for example line by line. Because in digital photography there is no physical curtain but rather a circuit-based switch between each pixel and the pre-charge source (and also between the pixel and readout circuitry), digital cameras are not restricted to rolling shutters that are line-based as in the above example, but can vary exposure/integration time among individual or distinct groups of pixels even where the pixels or groups are not contiguous for sequential exposure times.

To appreciate the statement immediately above, consider a scene with a first and second object in a foreground, each at a fixed object distance $s_{01}$ and $s_{02}$ from the lens, and a background at an object distance $S_{03}=\infty$ from the same lens. Assume the first object is in motion, so a shorter exposure time is desirable to maintain focus. Neither the second object nor the background is in motion, so a longer exposure time enhances photo quality due to more photons striking the pixels over the increased integration time. Longer exposure times are particularly valuable in low light conditions, or when an object is dark as compared to a bright background or vice versa. Light from the first object and passing through the lens falls primarily on a first set of pixels, and from the second object and the background fall primarily on a second and third set of pixels, respectively. To 'roll' exposure for the best combination of focus and resolution, pre-charge may be disconnected from the second and third sets of pixels, then at a later time disconnected from the first set, so that exposure/integration is begun at a different time for the first set as compared to the second and third sets. Reading out all pixel sets at the same time varies the integration period as between the first versus the second and third sets. Similarly, exposure time may be initiated at the same time for all three sets of pixels and terminated (by readout) at different times.

The integration period may be adaptive to the objects themselves (their speed of movement, their distance from the lens, etc.). The first object is imaged with a short exposure time/integration period and the second object and background are imaged with a longer integration time (movement adaptive). Where movement is not electronically sensed at the camera, the first and second sets of pixels may be integrated over a shorter time as compared to the third set, and the integration time for each set may be dependent upon distance from the lens (most digital cameras use auto focus). In the latter instance (distance adaptive), the first and second sets of pixels need not be contiguous along the sensor surface in order to 'roll' exposure, and the integrating periods for the first and second sets of pixels may be the same or different from one another (if $s_{01}=s_{02}$).

Figure 5:
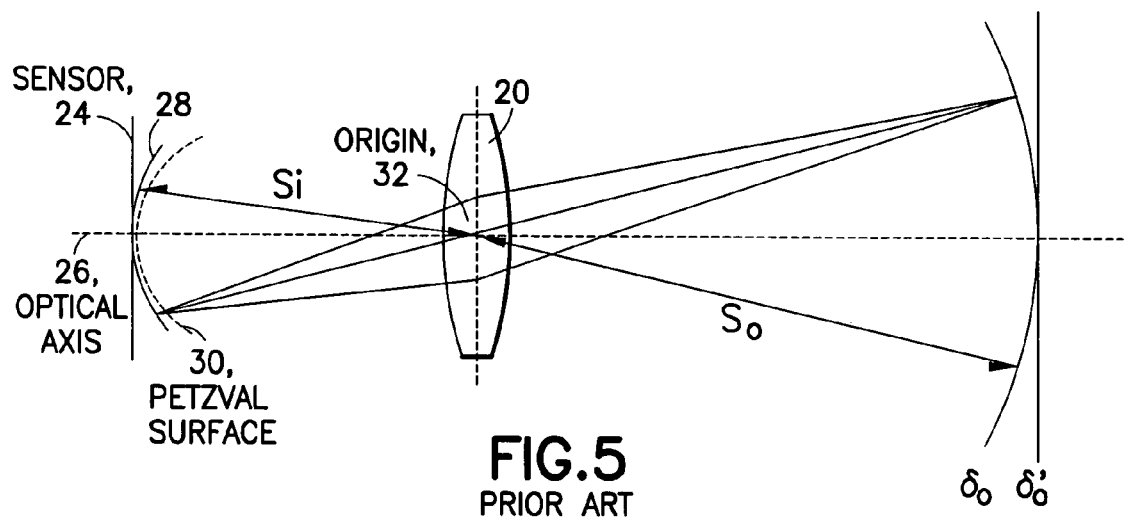
FIG. 5 is a prior art schematic diagram illustrating off-axis aberrations and a Petzval surface.

However, rolling exposure alone neither enhances depth of field nor corrects field curvature. To correct for field curvature (see FIG. 5), prior art solutions generally either use field flattening lens arrangements (typically four lenses, three positive and one negative), or curve the exposed film or sensor surface to more closely match the surfaces 28, 30 of FIG. 5. The present invention considers a different way to enhance depth of field and correct field curvature that incorporates the rolling shutter as above, in either film or digital manifestations.

Figure 6:
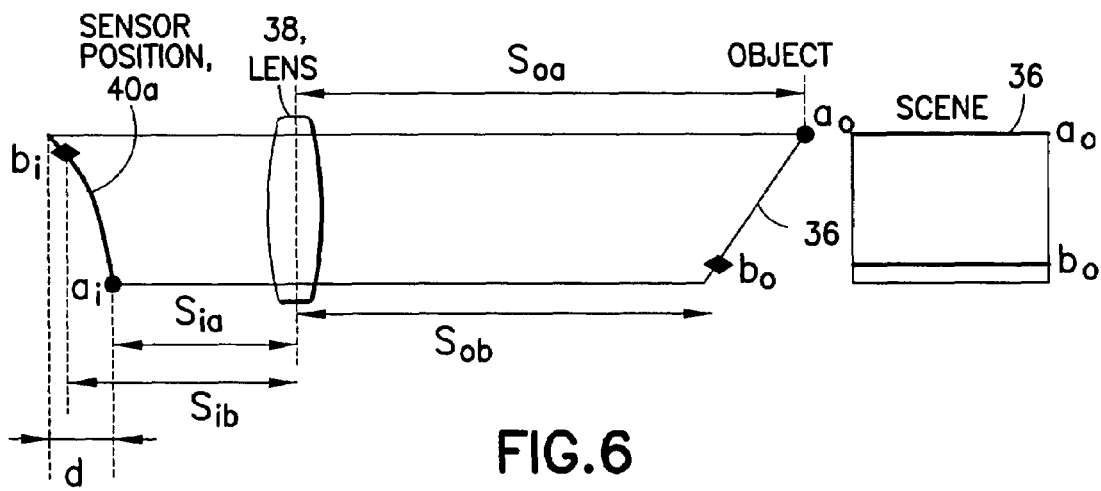
FIG. 6 is a schematic diagram showing a lens and sensor that illustrate the optical effect of an embodiment of the present invention.

Consider FIG. 6, a schematic view of a lens and sensor arrangement that shows the optical effect produced by an embodiment of the present invention. The scene 36 is shown at the right of FIG. 6 as viewed through the lens 38. In profile view, it is clear that the scene 36 is a flat plate angled with respect to the optical axis so that a first horizontal swath $a_0$ of the scene 36 is at a first object distance $s_{0a}$ from the lens 38, a second horizontal swath $b_0$ of the scene 36 is at a second object distance $s_{0b}$, and all other swaths are at intermediate object distances between those two. Statically, precise focus through the lens 38 for each swath of the scene 36 occurs along the curved sensor surface 40a, which varies between a first image distance $s_{ia}$ and a second image distance $s_{ib}$. The total distance between shortest and longest image distances is illustrated as the span d, and in FIG. 6 is that distance between nearest and furthest lines of the curved sensor surface 40a. However, the exact curvature of the sensor surface 40a and the exact span d may be made scene dependent by the present invention.

Figure 7:
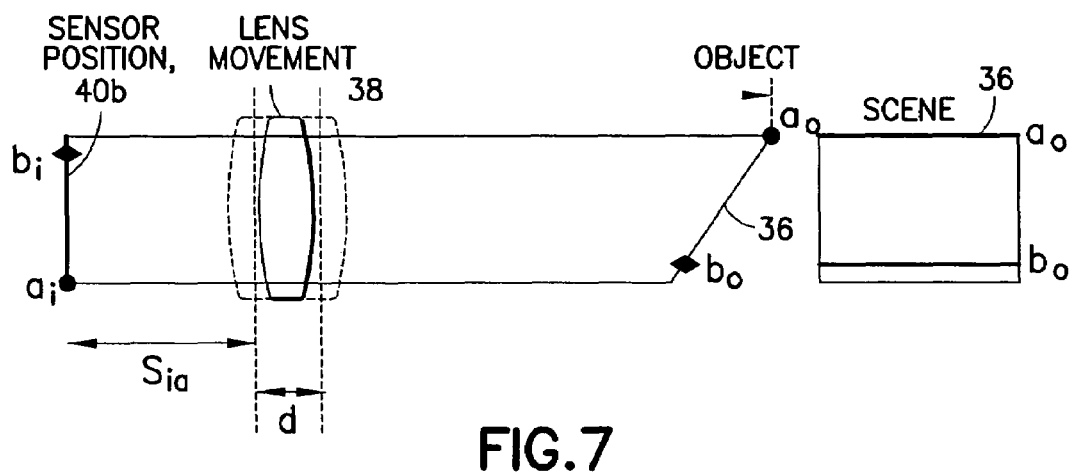
FIG. 7 is a schematic diagram showing a moveable lens and sensor according to an embodiment, which results in the optical effect of FIG. 6.

FIG. 7 illustrates the apparatus according to an embodiment of the present invention used to achieve the optical effect of FIG. 6. Rather than curve the sensor surface 40a (as in FIG. 6) in a manner that will produce the optimal result only for one relative arrangement of objects/swaths in the scene 36, the sensor surface 40b remains planar (and oriented perpendicular to the optical axis), and the lens 38 is moved the span d in order to provide precise focus for a variety of image distances between $s_{ia}$ and $s_{ia}$+d. Though the sensor surface 40b is flat, movement of the lens 38 creates the effect of a curved sensor surface 40a. It is noted that while the apparatus is described as the lens 38 moving relative to the sensor surface 40b, the lens may remain stationary (relative to a common housing in which both the sensor and lens are mounted) while the sensor is be moved, or both may move in synchronism. All such embodiments are encompassed where the lens is said to move relative to the sensor. Also, the sensor surface is preferably but not necessarily flat; the present invention may be used to impose an effective curvature to the sensor surface regardless of its underlying actual shape.

Figure 8:
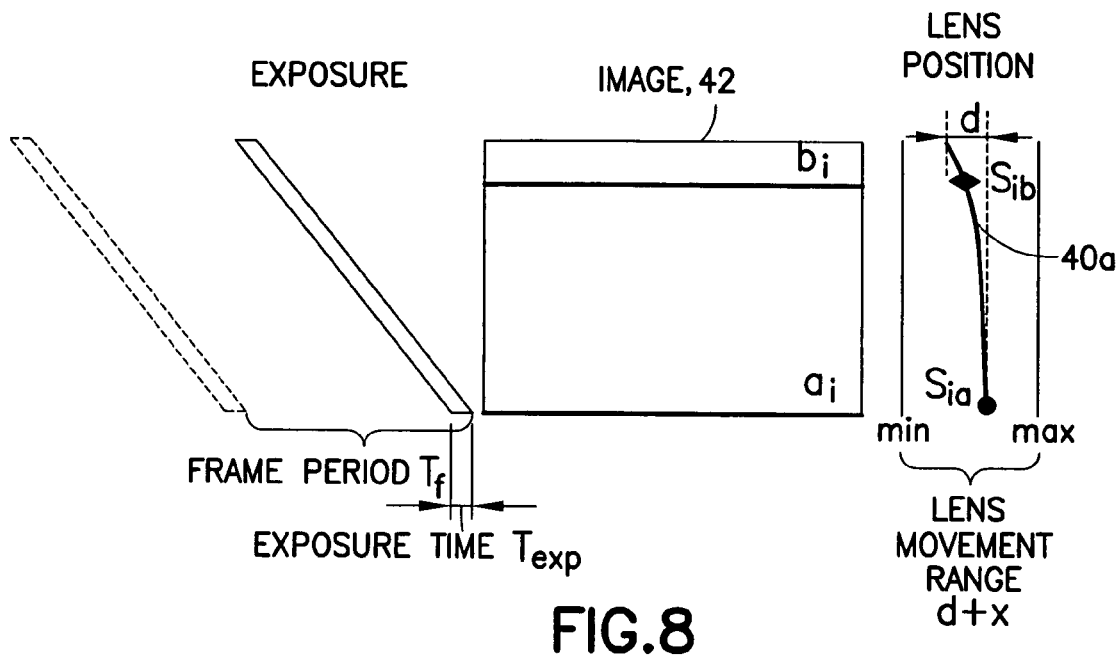
FIG. 8 is a schematic diagram showing the concept of a rolling shutter for exposing different rows of a sensor according to a first lens movement.
Figure 9:
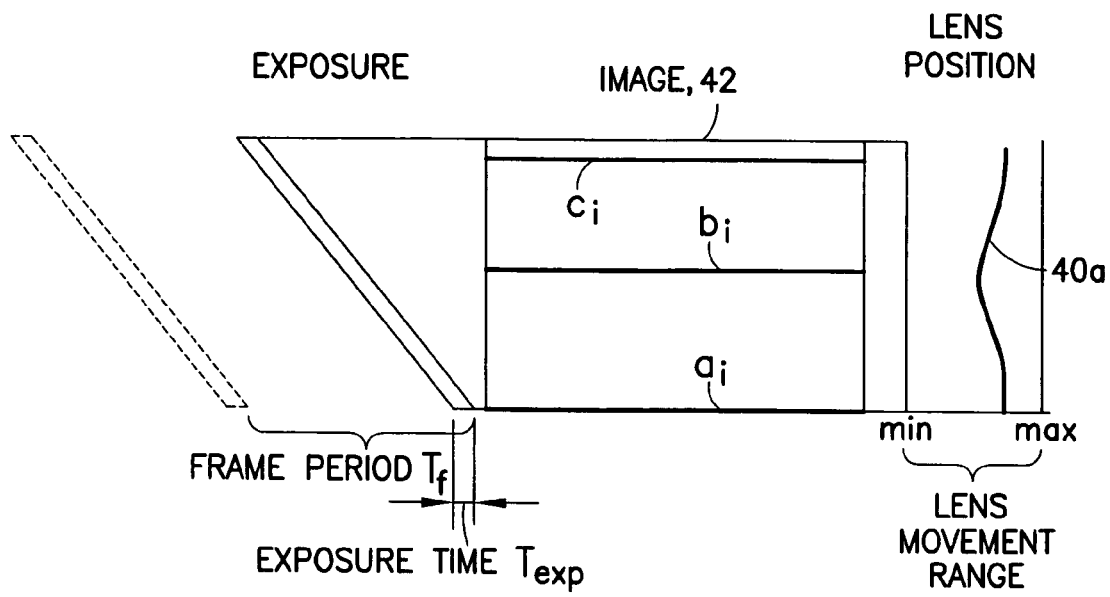
FIG. 9 is similar to FIG. 8 but for a second lens movement.

In the embodiment of FIG. 7, exposing all of the sensor surface 40b while the lens 38 moves relative to that surface 40b would result in out-of-focus images at those portions of the surface 40b for the time periods where the relative distance between lens 38 and surface 40b are aligned to focus a different swath of the scene 36 (e.g., a different image distance). The present invention solves this dilemma with a rolling shutter, as illustrated schematically at FIGS. 8 and 9. FIGS. 8 and 9 illustrate the image 42 at the sensor surface 40b, which is a vertically flipped version of the scene 36 of FIGS. 6 and 7. At the right of each of those Figures is a plot of the effective (curved) sensor surface 40a that results from movement of the lens 38 over the exposure time. The lens 38 is capable of movement across a distance d+x where the exposure time occurs only during movement over the distance d. For the vast majority of scenes, d will be less than d+x. To alleviate large accelerations and decelerations of the lens when it moves, movement of the lens 38 may be initiated prior to the start of the exposure time, and stopped following the end of the exposure time. The discrepancy between start (and stop) of lens movement and start (and stop) of exposure time is preferably less than a tenth or a hundredth of a second; the purpose is to avoid exposure during the instantaneously large accelerations of the lens as it begins and ends movement. These large accelerations are expected to induce distortions that are much more difficult to control than distortions due to constant-velocity movement of the lens 38 (such as where a line of the sensing surface is exposed for a longer period of time). Large changes in relative acceleration of the lens 38 appear unavoidable in situations where the lens 38 moves in one direction and reverses during a single exposure of the same pixel array or film. Such a reversal of lens direction may be avoided as detailed below.

In each of FIGS. 8 and 9, the image 42 exhibits different swaths, the different swaths corresponding to objects in the scene 36 at a nearer object distance, a further object distance, or somewhere in between. The further object (corresponding to the swath $a_i$ of the FIG. 8 image 42) is focused at a shorter image distance $s_{ia}$, and the nearer object (corresponding to the swath $b_i$ of the FIG. 8 image 42) is focused at a longer image distance $s_{ib}$.

A simple embodiment where different horizontal lines of the actual sensor surface 40b are exposed will first be detailed, and applies for exposure of both traditional film and digital pixels. Exposure of the different horizontal rows of the actual sensor surface 40*b* occur within a fixed exposure time $T_{exp}$ that is identical for each row, in this embodiment. Exposure among the rows 'rolls' synchronously with the lens 38. When the lens is at the image distance $s_{ib}$, incoming rays from the object $b_i$ located at the object distance corresponding to that image distance $s_{ib}$ is in focus at a row of pixels that are exposed at that particular time (while the lens 38 is at the image distance $s_{ib}$). When the lens moves to an image distance $s_{ia}$, incoming rays from the object $a_i$ located at the object distance corresponding to that image distance $s_{ia}$ is in focus at a row of pixels that are exposed at that particular time. As the lens 38 moves through position $s_{ib}$, the associated line(s) is/are exposed, but exposure does not continue as the lens 38 moves far from that position $s_{ib}$. As the lens is in the position $s_{ib}$, the lines associated with the farther object $a_i$ are not exposed until the lens 38 is closer to position $s_{ia}$, where that object $a_i$ would be in focus. FIG. 8 illustrates the condition where the lens 38 moves continuously in one direction during a single frame period, such as when imaging the inclined plane of FIGS. 6 and 7. A single frame period is the continuous exposure time over which any of the entire array of pixels or plate of film is exposed.

FIG. 9 illustrates a more typical scene, in which objects are not disposed continuously along a distance spectrum that varies linearly with the horizontal (as in FIG. 8) or vertical. In keeping with the convention established with FIGS. 6-8, the scene 36 has a horizontal swath $b_i$ within which a near object is at a distance $s_{ob}$ that corresponds to an image distance $s_{ib}$ for which that object would be focused on that actual sensor surface 40*b*, a horizontal swath $a_i$ within which a far object is at a distance $s_{oa}$ that corresponds to an image distance $s_{ia}$ for which that object would be focused on that actual sensor surface 40*b*, and in FIG. 9, there is an additional swath $c_i$ having an object at a distance similar to the swath $a_i$. However, the swath $b_i$ lies spatially between the swaths $a_i$ and $c_i$ in the image 42, so the lens must reverse direction of relative movement in order to properly focus each, assuming exposure of the lines is identical to that described with FIG. 8. As will be detailed below, the constraints of such an assumption may be avoided in digital photography. The effective sensor surface 40*a* is shown to the right of FIG. 9. The lens 38 begins at the shorter image distance $s_{ia}=s_{ic}$ where a first line of pixels or film is exposed to image the swath $c_i$ over a time period $T_{exp}$, moves toward the longer image distance $s_{ib}$ where exposure of the first line has ceased and a second line of pixels or film is exposed to image the swath $b_i$ over a similar exposure time, and returns back to the shorter image distance $s_{ia}=s_{ic}$ where a third line of pixels or film is exposed to image the swath $a_i$ over an exposure time. As will be appreciated, the results of FIGS. 8 and 9 may be achieved in either film or digital photography, with the shutter rolling in any direction, vertical, horizontal, or diagonal. Many pixel arrays used in digital photography are read out by rows, facilitating a linearly rolling shutter.

When the lens is moved synchronously with a linear rolling shutter, the effective curved sensor surface 40*a* is preferably along the Petzval curve 30. This curve is measured beforehand or is available from the lens design itself. In this instance, the curvature of the effective sensing surface 40*a* cannot perfectly match the Petzval surface 30 except in the plane shown in FIGS. 6-7. This is because the actual Petzval surface is circularly paraboloidal, whereas the lens moves only linearly with respect to the actual sensing surface 40*b* and cannot correct for curvature in front of and behind the plane illustrated in FIGS. 6-7. As detailed below, this may be overcome in a digital camera embodiment of the present invention.

Depth of field may be extended as compared to the prior art by determining object distances in a scene, calculating the best fit lens position curve to fit the object distances, and taking the picture. In the embodiments of the above descriptions, the best lens curve depends on the orientation of the camera itself, and the camera operator can rotate the camera to achieve a preferred image (as viewed on a digital viewfinder of a camera). For certain images such as a macro of a scene having an insect or business card in a very near field, it may be preferable to use a shallower depth of field where only the object of interest (the insect or business card) is in focus and other objects (background) are purposefully out of focus. In such instances, the selected lens curve exhibits focus only for the object of interest.

The above illustrations assume the shutter rolls continuously along sequential lines (horizontal, vertical, diagonal). Just as FIG. 9 distinguished the lens reversing its travel during a single frame period, the shutter may roll back and forth during that same frame period. This may cause double exposure in film, but as described above, digital photography need not re-expose the same pixels because it can end integration (exposure) on a pixel-by-pixel basis merely by reading out at a certain time for any particular pixel (or otherwise storing a final voltage reading or other figure of merit related to voltage decay). Further exposure of that pixel, after readout, may further decay retained voltage, but the controlling electronics (e.g., readout circuitry, separate digital signal processor, etc.) can merely ignore any further decay. Thus, digital photography may expand the rolling shutter to roll along different discontinuous sections of pixels to mirror the scene being imaged. This may entail reading out different lines of a pixel array at different times, or reading out individual pixels of the array (where the readout integrated circuit enables individual pixel readout rather than the more common readout by rows).

Figure 10A:
FIG. 10A is a scene showing objects at four different object distances.
Figure 10B:
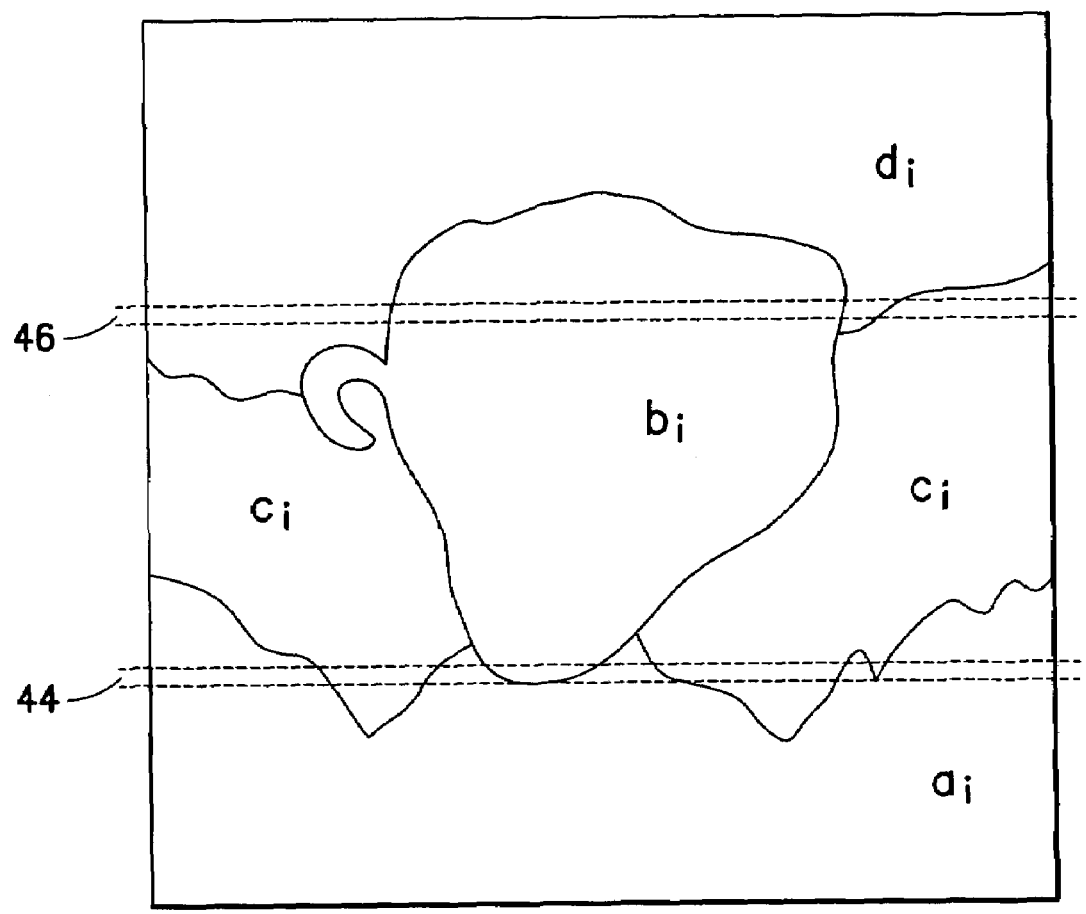
FIG. 10B is a sensor surface with outlines of the objects of FIG. 10A, illustrating scene adaptive pixel exposure as a focusing lens translates.

Consider FIGS. 10A-B. FIG. 10A is a scene and FIG. 10B is a sensing surface 40*b* with pixels (not individually shown) matched to certain objects within that scene. The image of FIG. 10B is inverted as compared to the scene of FIG. 10A, as it would be when the scene is imaged through an optical lens 38. For simplicity, assume the various objects in the scene may be parsed into four distinct object distances, the objects represented in FIG. 10B as $a_i$, $b_i$, $c_i$ (two occurrences) and $d_i$. These objects are at object distances $s_{oa}$, $s_{ob}$, $s_{oc}$ and $s_{od}$, with matching image distances $s_{ia}$, $s_{ib}$, $s_{ic}$, $s_{id}$. As is evident in FIG. 10A, object $d_i$ is the near foreground and exhibits the shortest object distance; object $b_i$ is the stuffed animal and exhibits a near-medium object distance; objects $c_i$ are the hills and exhibit a far-medium object distance; and object $a_i$ is the sky and exhibits the farthest object distance. So as to maintain the four objects as optically distinct, assume that the only light rays that may be considered as parallel when incoming to the lens 38 are those from the sky, object $a_i$.

Clearly, rolling the shutter along sequential horizontal swaths such as those shown in dashed lines 44, 46 will result in some portion of the swath being out of focus. For example, if the lens 38 lies at the image distance $s_{ib}$ while exposing the pixels for swath 44, regions of that swath 44 that image portions of the sky $a_i$ and hills $c_i$ may be out of focus. Instead, distance measuring equipment (such as auto focus apparatus) may be used to determine the distance to the different objects, and the outline of those objects as in FIG. 10B. Pixels along the sensor surface 40*b* that correspond to the various objects are then exposed only when the lens 38 is at the proper image distance for that particular object. This enables the lens to avoid reversing its direction of movement during a single exposure of the pixilated-array sensing surface in all instances. This is advantageous because the lens movement apparatus is necessarily a mechanical system because it translated the lens 38, whereas adaptive pixel exposure is electronic and therefore precisely controlled at a lower manufacturing cost, and less subject to failure.

Consider how a rolling shutter would operate for FIG. 10B if it were adaptable to object distances in the scene of FIG. 10B. The lens 38 translates in only one direction, assume away from the sensing surface 40b. At some minimal time period following initiation of lens movement, the lens 38 is at image distance $s_{ia}$, at which time only those pixels within the outline of object $a_i$ are exposed. For now, assume a constant integration time/exposure time $T_{exp}$. As the lens moves further from the sensing surface 40b and through the image distance $s_{ic}$, those pixels within the outline of the hills $c_i$ are exposed, and so forth through the image distances $s_{ib}$ and $s_{ia}$, at which time all exposure ceases and the lens 38 halts movement shortly thereafter. Field curvature is corrected in the resulting image to the precision of the distance measuring equipment, depth of field is greatly increased because the resulting image is made from four image distances rather than one, and the same advantage may be extended to any scene, regardless of relative positions of the objects therein.

Now consider varying exposure time of the individual pixels. In FIG. 10A, the sky $a_i$, hills $c_i$, and foreground $d_i$ are relatively bright while the central object, the stuffed animal $b_i$ that is the (aesthetic) focus of the scene, is dark. Film or digital, the known prior art would expose all four object for the same exposure time/integration time, finding a acceptable middle ground where the darker central object $b_i$ is exposed sufficiently so as to exhibit some detail in the resulting image, but where the peripheral but bright objects $a_i$, $c_i$, and $d_i$ are not overexposed and 'bleached'. In the digital embodiment, the present invention suffers no such limitation of constant exposure for all pixels of the sensing surface 40b. As the lens 38 moves, the pixels corresponding to the darker objects such as the stuffed animal $b_i$ may be exposed/integrated over a longer period of time as compared to the lighter objects such as the sky $a_i$, hills $c_i$, and foreground $d_i$. More particularly, the stuffed animal $b_i$ has a dark body but white tusks; pixels corresponding to the darker body may be exposed for a longer period of time as compared to those corresponding to the white tusks to achieve better detail in the body without overexposing the tusks. Light sensing equipment is well known in the camera arts, and can be used in conjunction with distance measuring equipment to determine, prior to the start of any frame period, the object distances and relative brightness of each object. Brightness of the overall image may be set by normalizing the brightness of each pixel or separate sections of pixels based on their relative integration times. This is seen as a superior approach to digital enhancement of exiting digital images as currently practices, because it is understood that current practice is to enhance using generic algorithms whereas normalizing brightness after brightness-adaptive exposure takes its universe of information from the actual scene as captured by the pixels.

As briefly noted above, exposure time may also be adaptive to object motion. Shorter exposure times are necessary to accurately focus moving objects, at the cost of brightness. Non-moving or slowly moving objects may enable a longer exposure time without appreciable loss of sharpness or focus in the resulting image. Using known movement detection equipment that operates on the same principle as distance measuring equipment, movement of different objects within a scene may be categorized, and pixels corresponding to the individual objects may be exposed for a short or longer period depending upon relative movement of the objects themselves. Determining the exact pixels for which a fast-moving object is to be captured is merely a matter of extrapolating which pixels would image the moving object at the time the lens is at that object's image distance based on (past) detected movement.

Figure 11:
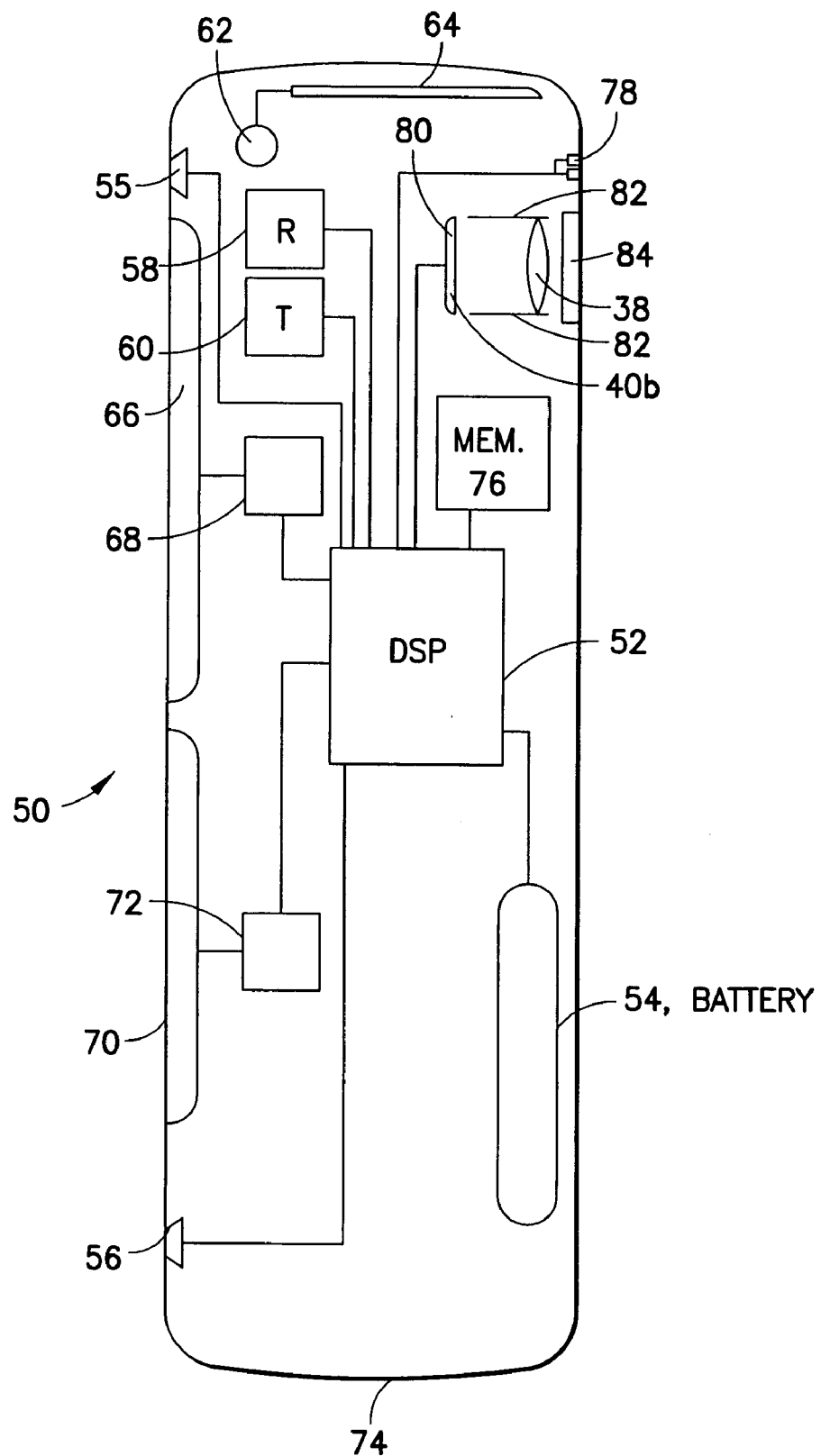
FIG. 11 is a schematic block diagram showing a camera according to the present invention disposed within a mobile station.

FIG. 11 is a sectional schematic block diagram of a mobile station MS 50, such as a cellular telephone, a personal digital assistant with two-way communications capability, or any other handheld portable device of similar functionality. The MS 50 includes a digital signal processor DSP 52, powered by a galvanic power source such as a battery 54 and coupled to transducers 55 (speaker) and 56 (microphone). Receiving circuitry 58 and transmitting circuitry 60 are coupled through a switch or dipole filter 62 to one or more antennas 64. A graphical display interface 66 by which a user views text and images is controlled by a display driver 68. Similarly, a user input pad 70, such as may include buttons, joysticks, and/or touch sensitive areas, is controlled by an input driver 72.

Computer programs for operating the various sub-systems of the MS 50 are stored in a memory 76, which may be a combination of volatile and non-volatile storage media, possibly dispersed among various spatial locations within the housing 74, which is a computer readable storage media for data and programs. Various other buffers, filters, encoders and the like are also within the housing 74, but peripheral to the invention. One or more detectors 78 penetrate the housing 74 and are used to measure object distances, object brightness, or relative object movement/speed in a scene when the DSP 52 is in condition to take a picture (image).

There are several possibilities to measure object distances, for example, using the camera and an illuminator creating a typically diverging light spot/pattern, wherein the size, position or intensity of the spot/pattern is determined from the image. It is possible also to use different type of time-of-flight measurement principles, that might be implemented either optically or using even acoustic principles. In order to measure object brightness, one method is to use the camera itself for capturing a test image where the brightness of the object is then determined. This can be done before the actual final image is captured during the framing phase when the user is aiming the camera in order to frame the image properly for the shot. By capturing several images with different exposure times, optimal exposure times for different areas of the image can be determined. However, the invention is not limited to the above mentioned examples of determining the object properties or suitable exposure levels.

The DSP is in condition to take a picture when it provides a pre-charge to pixels on a pixilated array that form a sensing surface 40b at which an image is electronically captured. The surface 40b may preferably be directly mounted to a readout integrated circuit ROIC 80 or merely coupled electronically. The ROIC 80 may control each pixel individually, it may control them according to rows/lines, or it may control them according to contiguous groupings (e.g., groups of four pixels forming a square, five pixels forming a diamond with one pixel in the center, etc.). Integration times for each pixel or row or group of pixels may be started and stopped at times independent of that for other pixels or rows or groups of pixels, based on the design of the readout circuitry.

A lens 38 is mounted to upper and lower rails 82 and translates along the optical axis of the lens by use of mechanical linkage such as an extendable scissors arrangement or less optimally a rotating shaft with a continuous groove about it similar to a screw. Such mechanical linkage is well known in the art for manually or automatically changing an image distance of a conventional camera lens. The distinction over a conventional auto focus camera lens is that the linkage operates to move the lens during the exposure frame period, rather than moving it prior to the start of that exposure frame period. A window 84 is aligned with the lens and allows light from a scene to pass through the housing 74 and the lens 38 to expose various pixels of the surface 40b. A computer program to operate the mechanical linkage in synchronous relation to the integration/exposure of the various different pixels along the surface 40b is stored in the memory 76 and executed by the DSP 52. This program may also use inputs from the detectors 78 to adjust the synchronous lens movement/pixel exposure actions according to the scene. Particularly, exposure of certain pixels may occur when the lens is at an image distance corresponding to an object distance measured at the detectors 78; exposure time for certain pixels may be predicated on an object's speed or brightness as determined by the detectors 78. Various adaptations of this MS-based embodiment are also possible, as detailed above. FIG. 11 illustrates only one embodiment, the rest of which will be obvious given the above detailed description of various adaptations such as translating the sensor surface 40b rather than or in conjunction with the lens 38; reading out the pixels by row only; and using film rather than a pixilated array, among others.

Further, the effect similar to moving the lens(es) and/or sensing surface, may also be accomplished using a liquid lens or other techniques, where the focal length of the lens itself is changed by changing the shape or refraction index of the optical material of the lens(es). U.S. Pat. No. 6,369,954 describes an optical lens having two liquids with different optical indices, one being conductive and one being nonconductive. The image distance is changed by applying a voltage to the conductive liquid, which then changes shape so that the focal length of the lens itself is changed. In the liquid lens arrangement of the U.S. Pat. No. 6,369,954 patent, a first image distance arises from a first lens shape. A second image distance arises from a second lens shape, even though the first and second image distances behind the changed lens at which light from different object distances is focused may be identical. This is true because it is the shape of the lens itself that changes, effectively changing the image distance. The same result holds where the refractive index of the lens or some medium between the lens and the sensor is changed, or other embodiments that avoid or reduce the necessity of moving the lens and sensor components relative to one another. In all cases, the effective image distance is changed. Moving a traditional lens relative to the sensing surface, or changing the lens shape or refractive index, or changing the refractive index of some medium between the lens and sensing surface, are all ways to change the optical relationship between the lens and the sensing surface so as to maintain the sensing surface at different effective image distances during the imaging of a single scene in a single, continuous exposure of the sensing surface.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

What is claimed is:

1. A method comprising:
    manipulating an optical relationship between an optical lens and an image sensing surface so that the image sensing surface is spaced at different effective image distances from the lens; and
    exposing different portions of the image sensing surface synchronous with manipulating the optical relationship by adaptively exposing said portions for different exposure periods based on detected movement of at least two objects.

2. The method of claim 1, wherein the image sensing surface comprises an array of photosensitive pixels.

3. A method comprising:
    manipulating an optical relationship between an optical lens and an image sensing surface so that the image sensing surface is spaced at different effective image distances from the lens; and
    exposing different portions of the image sensing surface synchronous with manipulating the optical relationship by adaptively exposing said portions for different exposure periods based on detected brightness of at least two objects.

4. A method comprising:
    manipulating an optical relationship between an optical lens and an image sensing surface so that the image sensing surface is spaced at different effective image distances from the lens; and
    exposing different portions of the image sensing surface synchronous with manipulating the optical relationship,
    wherein the image sensing surface comprises an array of pixels in adjacent rows, wherein a first portion of the array is exposed while the image sensing surface is at a first effective image distance, and a second portion of the array is exposed while the sensing surface is at a second effective image distance, and wherein at least one pixel of the first portion is in a same row of the array as at least one pixel of the second portion.

5. The method of claim 4, wherein at least one of manipulating the optical relationship and exposing different portions of the image sensing surface are adaptive to objects in a scene to be imaged at the sensing surface.

6. The method of claim 4, wherein exposing different portions of the image sensing surface comprises adaptively exposing said portions based on at least a detected first and second object distance.

7. The method of claim 4, wherein manipulating the optical relationship comprises manipulating between a first effective image distance and a second effective image distance, wherein the first and second effective image distances correspond respectively to the first and second object distances.

8. The method of claim 4, wherein manipulating the optical relationship comprises moving at least one of the lens and the sensing surface relative to one another.

9. A method comprising:
    manipulating an optical relationship between an optical lens and an image sensing surface so that the image sensing surface is spaced at different effective image distances from the lens; and
    exposing different portions of the image sensing surface synchronous with manipulating the optical relationship,
    wherein manipulating the optical relationship synchronously with exposing operates to impose an effective curvature to the sensing surface that approximates a Petzval surface.

10. A method comprising:
  manipulating an optical relationship between an optical lens and an image sensing surface so that the image sensing surface is spaced at different effective image distances from the lens; and
  exposing different portions of the image sensing surface synchronous with manipulating the optical relationship, wherein manipulating the optical relationship comprises altering a shape of the lens.

11. A method comprising:
  determining a first object distance between a first object in a scene and a lens;
  determining a second object distance between a second object in the scene and the lens;
  within a continuous exposure frame:
    exposing a first portion of an image sensing surface while the image sensing surface is at a first effective image distance from the lens, where the first effective image distance corresponds to the first object distance;
    exposing a second portion of the image sensing surface while the image sensing surface is at a second effective image distance from the lens, where the second effective image distance corresponds to the second object distance; and combining the exposed first and second portions into a single image.

12. The method of claim 11, wherein the single image is displayed on a digital graphical user interface.

13. The method of claim 11, wherein exposing the first and second portion of the image sensing surface comprises adaptively exposing said portions for a first and second exposure time based on a detected brightness of the first and second objects.

14. The method of claim 11, wherein exposing the first and second portion of the image sensing surface comprises adaptively exposing said portions for a first and second exposure time based on a detected speed of movement of the first and second objects.

15. A memory storing a program of machine-readable instructions, executable by a digital data processor, to perform actions directed toward operating a camera, the actions comprising:
  during an exposure frame period, maintaining an image sensing surface at a variable effective image distance from a lens synchronously with exposing different portions of the sensing surface, wherein the image sensing surface comprises an array of photosensitive pixels.

16. The memory of claim 15, wherein at least one of maintaining the image sensing surface at a variable effective image distance and exposing different portions of the image sensing surface are adaptive to objects in a scene to be imaged at the sensing surface.

17. The memory of claim 15, wherein exposing different portions of the image sensing surface comprises adaptively exposing said portions based on at least a detected first and second object distance.

18. The memory of claim 15, wherein maintaining an image sensing surface at a variable effective image distance comprises varying between a first and a second image distance that respectively correspond to the first and second object distances.

19. The memory of claim 15, wherein exposing different portions of the image sensing surface comprises adaptively exposing said portions for different exposure periods based on detected movement of at least two objects.

20. The memory of claim 15, wherein exposing different portions of the image sensing surface comprises adaptively exposing said portions for different exposure periods based on detected brightness of at least two objects.

21. The memory of claim 15, wherein the program controls exposure of the photosensitive pixels according to rows.

22. The memory of claim 15, wherein the program controls exposure of the photosensitive pixels individually.

23. The memory of claim 15, wherein maintaining an image sensing surface at a variable effective image distance synchronously with exposing operates to impose an effective curvature to the sensing surface that approximates a Petzval surface.

24. The memory of claim 15, wherein maintaining the image sensing surface at a variable effective image distance from the lens comprises moving the lens relative to the sensing surface.

25. The memory of claim 15, wherein maintaining the image sensing surface at a variable effective image distance from the lens comprises changing a shape of the lens.

* * * * *